United States Patent
Chang et al.

(10) Patent No.: US 7,633,951 B2
(45) Date of Patent: *Dec. 15, 2009

(54) ETHERNET WIDE AREA NETWORK AND METHOD

(75) Inventors: Frederick Robert Chang, Austin, TX (US); Shih Chung Soon, Dublin, CA (US)

(73) Assignee: AT&T Intellectual Property I, LP, Reno, NV (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/359,822

(22) Filed: Feb. 22, 2006

(65) Prior Publication Data

US 2006/0153213 A1    Jul. 13, 2006

Related U.S. Application Data

(63) Continuation of application No. 10/141,370, filed on May 8, 2002, now Pat. No. 7,046,671.

(51) Int. Cl.
*H04L 12/28* (2006.01)
*H04L 12/56* (2006.01)
*G06F 15/16* (2006.01)
*G06F 15/173* (2006.01)

(52) U.S. Cl. .............. 370/400; 370/389; 370/395; 370/401; 709/227; 709/238

(58) Field of Classification Search ......... 370/395–401, 370/466–474, 232–352, 356–389; 709/220–227, 709/235–352, 356–389
See application file for complete search history.

(56) References Cited

U.S. PATENT DOCUMENTS

| | | | |
|---|---|---|---|
| 5,430,728 A | 7/1995 | Narayanan et al. | |
| 5,818,619 A | 10/1998 | Medved et al. | |
| 5,818,842 A | 10/1998 | Burwell et al. | |
| 5,917,820 A | 6/1999 | Rekhter | |
| 5,936,963 A | 8/1999 | Saussy | |
| 5,978,373 A | * 11/1999 | Hoff et al. | ............... 370/392 |
| 6,061,728 A | 5/2000 | Mead et al. | |
| 6,141,126 A | 10/2000 | Lahat et al. | |
| 6,151,635 A | 11/2000 | Bare | |
| 6,178,462 B1 | 1/2001 | Bass et al. | |
| 6,181,695 B1 | 1/2001 | Currey et al. | |
| 6,222,848 B1 | 4/2001 | Hayward et al. | |
| 6,226,296 B1 | 5/2001 | Lindsey et al. | |
| 6,337,863 B1 | 1/2002 | Nair et al. | |

(Continued)

OTHER PUBLICATIONS 802.1Q. Network World Fusion, http://www.nwfusion.com/cgi-bin/mailto/x.cgi. Retrieved Mar. 31, 2005, 2 pages.

(Continued)

*Primary Examiner*—Man Phan
(74) *Attorney, Agent, or Firm*—Hanley, Flight & Zimmerman, LLC

(57) ABSTRACT

An ethernet wide area network (10) has a number of interconnected network ethernet switches (12). A first local area network (18) has a first local area ethernet switch (16) and is connected to one (14) of the interconnected network ethernet switches (12). A second local area network (24) has a second local area ethernet switch (22) connected to a second (20) of the interconnected network ethernet switches (12).

13 Claims, 6 Drawing Sheets

U.S. PATENT DOCUMENTS

| | | |
|---|---|---|
| 6,343,330 B1 | 1/2002 | Khanna et al. |
| 6,389,023 B1 | 5/2002 | Matsuzawa et al. |
| 6,442,610 B1 * | 8/2002 | Khanna et al. ............. 709/227 |
| 6,490,292 B1 | 12/2002 | Matsuzawa |
| 6,577,631 B1 * | 6/2003 | Keenan et al. ............. 370/394 |
| 6,591,303 B1 * | 7/2003 | Hendel et al. ............. 709/238 |
| 6,603,769 B1 | 8/2003 | Thubert et al. |
| 6,704,326 B2 * | 3/2004 | Russell et al. ............. 370/466 |
| 6,847,620 B1 * | 1/2005 | Meier ........................ 370/328 |
| 2002/0027906 A1 | 3/2002 | Athreya et al. |
| 2002/0101868 A1 | 8/2002 | Clear et al. |
| 2002/0101875 A1 | 8/2002 | Lui et al. |
| 2003/0131105 A1 | 7/2003 | Czeiger et al. |

OTHER PUBLICATIONS

Virtual Local Area Networks, http://www.cis.ohio-state.edu/~jain/cis788-97/virtual_lans/index.htm. Retrieved Feb. 7, 2000, 12 pages.

"International Search Report" for corresponding PCT application serial No. PCT/US2003/013949 mailed Dec. 5, 2003 (1 page).

* cited by examiner

ETHERNET WIDE AREA NETWORK AND METHOD

RELATED APPLICATIONS

The present application is a continuation of the U.S. patent application Ser. No. 10/141,370, filed on May 8, 2002, now U.S. Pat. No. 7,046,671.

FIELD OF THE INVENTION

The present invention relates generally to wide area networks and more particularly to an ethernet wide area network and method.

BACKGROUND OF THE INVENTION

Ethernet (IEEE 802.1D(2)) is the technology that dominates the local area networking market. As a result, this technology is inexpensive and well known by most users. There has been an interest in using ethernet technology for wide area networks. Unfortunately the technology purposefully has a number of built-in limitations. For instance, IEEE 802.1D(2) limits the maximum diameter as seven hubs. When the number of hubs exceeds the maximum diameter, the topology updates sent using BPDU (Broadcast Protocol Data Units) packets may never reach their intended nodes. As a result, such nodes may become isolated even though they are physically connected to the network. Another problem arises due to the MAC (Medium Access Control) address awareness requirements. Each bridge node in a spanning tree must be aware of all the MAC addresses and their locations in the spanning tree. In a wide area network (WAN) this results in the storage of huge numbers of MAC addresses and becomes technically and economically infeasible for large WANs.

Thus there exists a need for an ethernet wide area network and method that overcomes these limitations.

DETAILED DESCRIPTION OF THE DRAWINGS

An ethernet wide area network has a number of interconnected network ethernet switches. A first local area network has a first local area ethernet switch and is connected to one of the interconnected network ethernet switches. A second local area network has a second local area ethernet switch connected to a second of the interconnected network ethernet switches. The network ethernet switches include a translation table from a network address to a MAC address. This table allows for translation between network addresses and MAC addresses and this reduces the size of the spanning tree.

Figure 1:
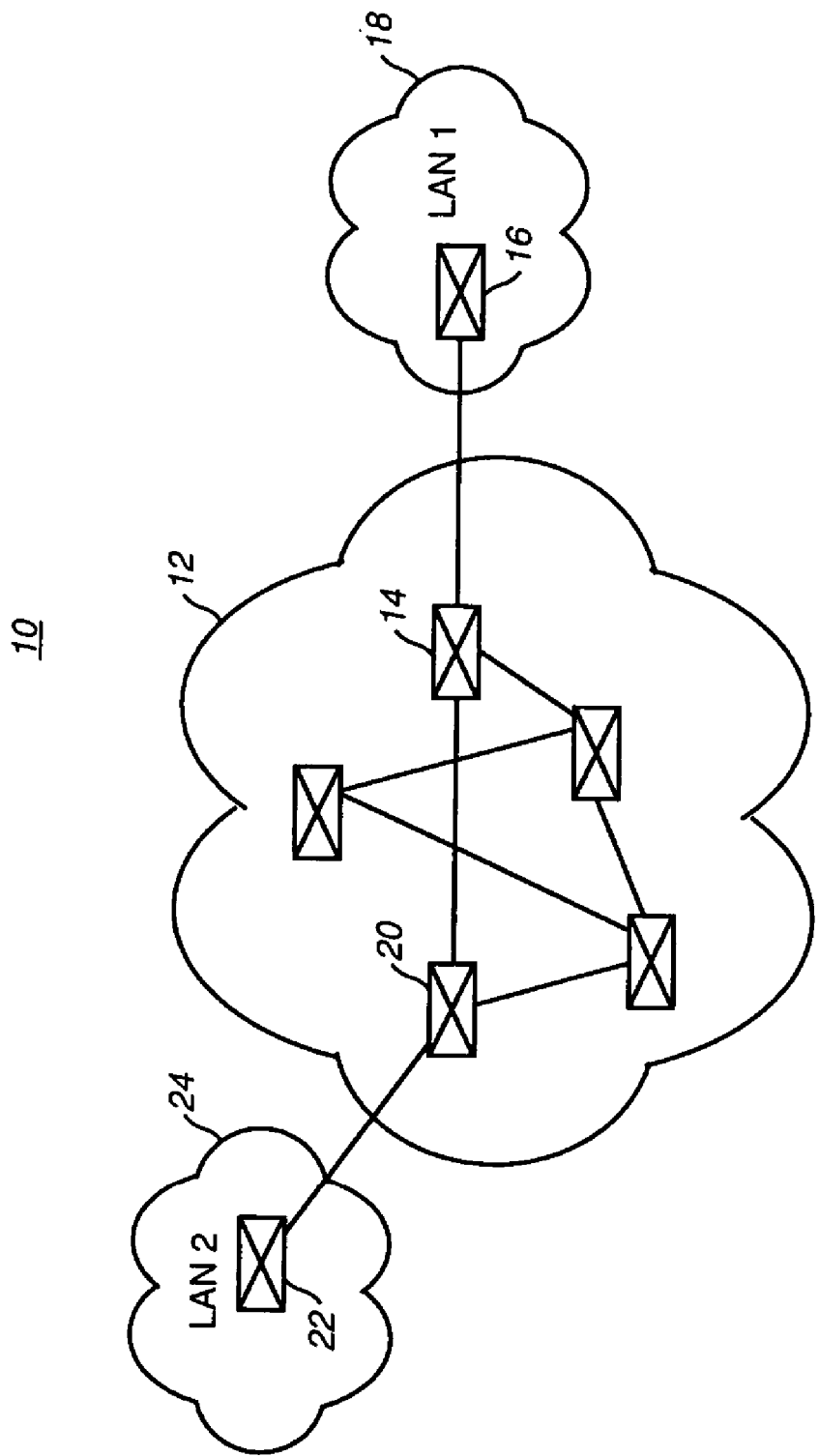
FIG. 1 is a block diagram of an ethernet wide area network in accordance with one embodiment of the invention.

FIG. 1 is a block diagram of an ethernet wide area network 10 in accordance with one embodiment of the invention. The ethernet wide area network 10 has a plurality of interconnected network ethernet switches 12. One 14 of the plurality of interconnected network ethernet switches 12 is connected to a first local area ethernet switch 16 in a first local area network 18. A second 20 of the plurality of interconnected network ethernet switches 12 is connected to a second local area ethernet switch 22 in a second local area network 24. The system 10 allows for an ethernet network across large distances (national, international) and allows for more than seven hubs. This is made possible in part by the adaptations of the ethernet switches in wide area network 12. The wide area network may be a service provider that allows multiple customers to setup nationwide, international or large ethernet networks.

Figure 2:
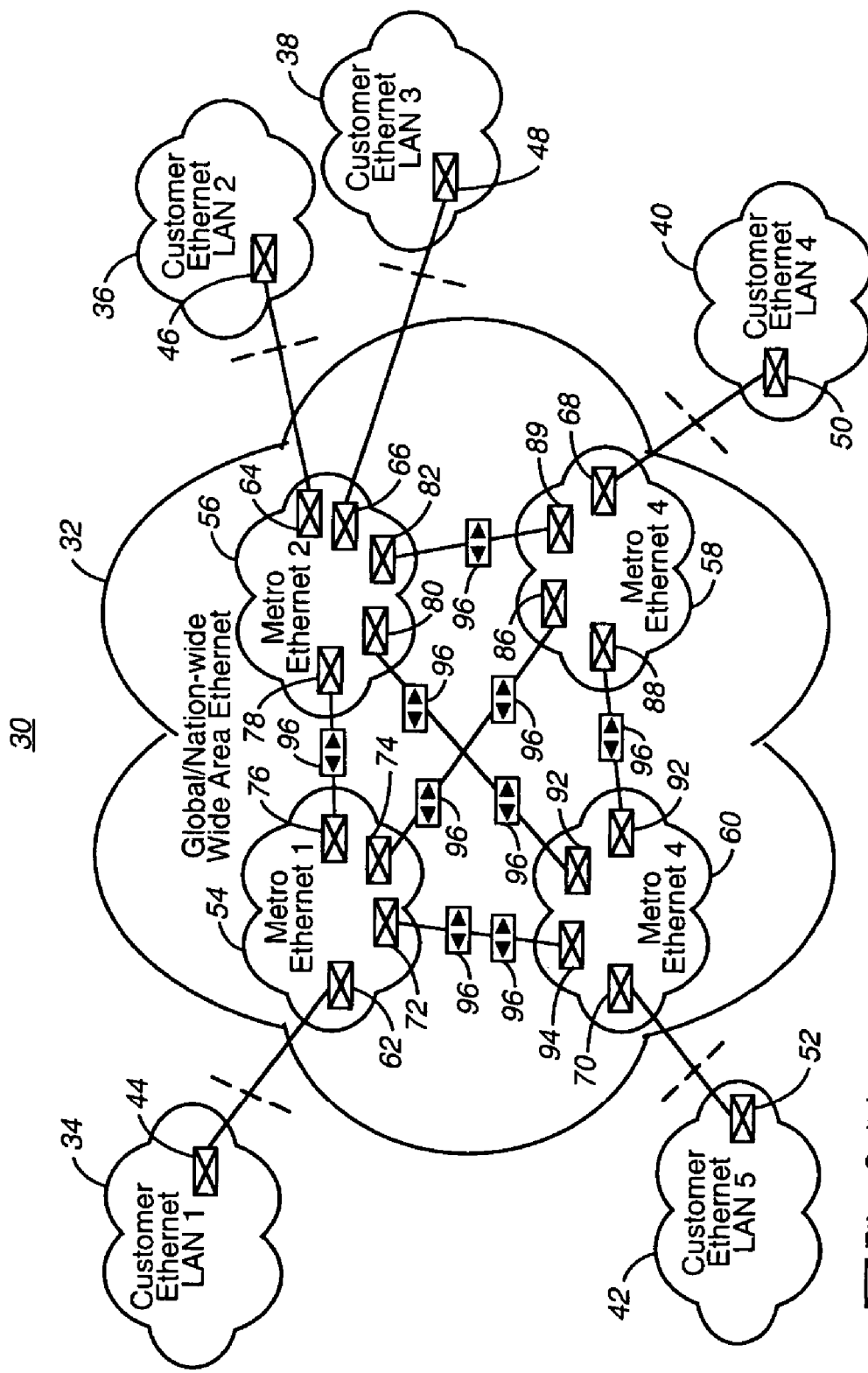
FIG. 2 is a block diagram of an ethernet wide area network in accordance with one embodiment of the invention.

FIG. 2 is a block diagram of an ethernet wide area network 30 in accordance with one embodiment of the invention. The ethernet network 30 has a global wide area network (WAN) 32. The global ethernet WAN 32 may be a service providers network that is leased out to users. Customers connect their ethernet local area networks (LAN) 34, 36, 38, 40, 42 to the global ethernet WAN 32. The LANs 34, 36, 38, 40, 42 each have an ethernet switch 44, 46, 48, 50, 52 that provides the connection to the global WAN 32. The global WAN 32 is physically comprised of a plurality of metropolitan ethernets 54, 56, 58, 60. Within the metropolitan ethernets 54, 56, 58, 60 the topology is not shown. The metropolitan ethernets 54, 56, 58, 60 have service interface ethernet switches 62, 64, 66, 68, 70 and network interface ethernet switches 72, 74, 78, 80, 82, 84, 86, 88, 90, 92, 94. The service interface ethernet switches 62, 64, 66, 68, 70 connect to the customer ethernet switches 44, 46, 48; 50, 52. The network interface ethernet switches 72, 74, 78, 80, 82, 84, 86, 88, 90, 92, 94 connect the metropolitan ethernet networks 54, 56, 58, 60. The current gigabit optical ethernet standard requires an optical signal repeater for two ethernet switches separated by over 80 Km. A number of optical signal repeaters 96 are shown connecting the metropolitan ethernet networks 54, 56, 58, 60. Note that more than a single optical signal repeater 96 may be required to connect two ethernet switches.

Figure 3:
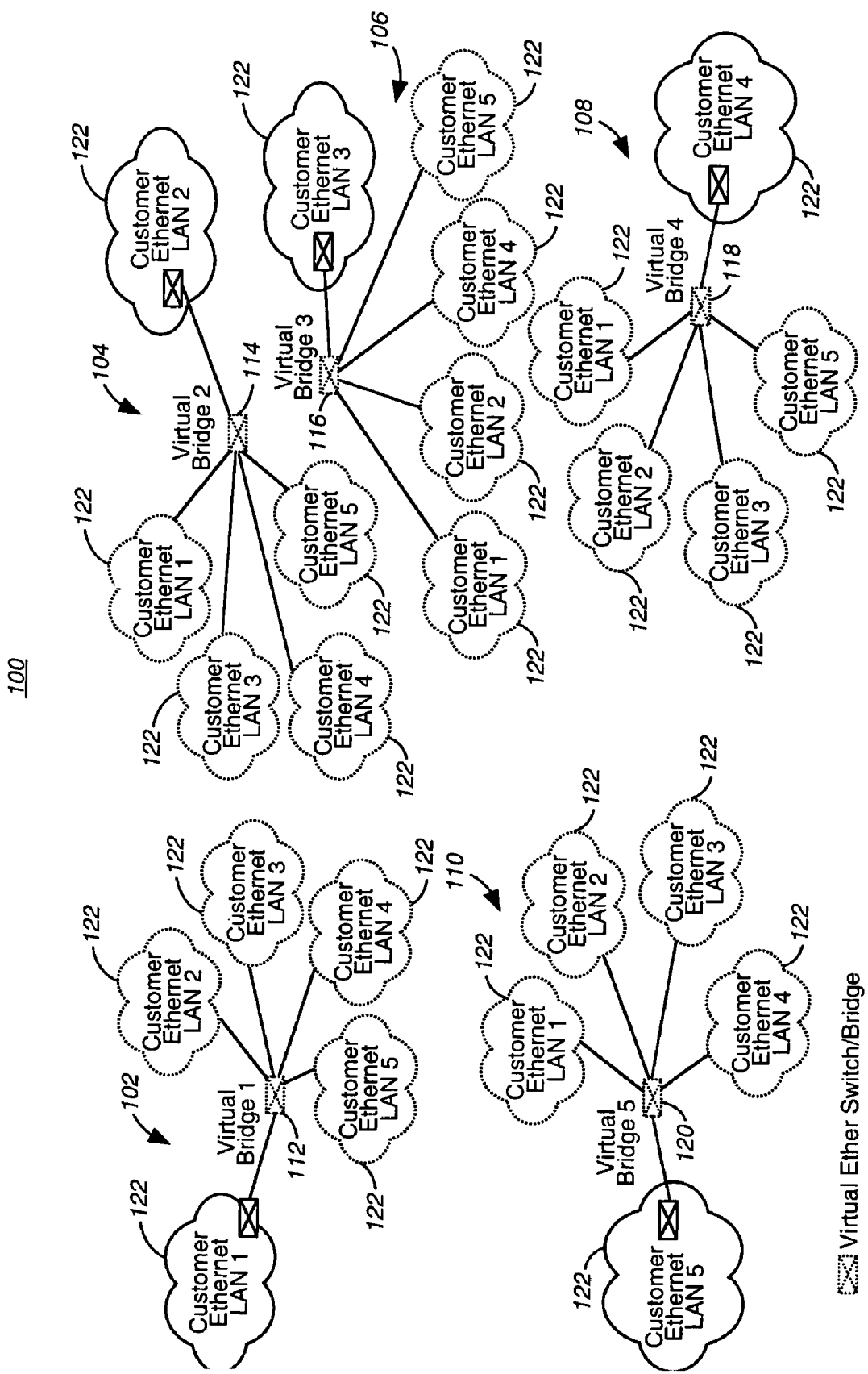
FIG. 3 is a conceptual drawing of an ethernet wide area network service in accordance with one embodiment of the invention.

FIG. 3 is a conceptual drawing of an ethernet wide area network service 100 in accordance with one embodiment of the invention. This drawing depicts the ethernet wide area service from an end user point of view. The end user sees a number of separate ethernet wide area networks 102, 104, 106, 108, 110. Each customers' ethernet WAN has a virtual ethernet switch or bridge (virtual bridge) 112, 114, 116, 118, 120 that connects the customers separate local area networks (LANs) 122. The virtual bridge 112, 114, 116, 118, 120 participates in the customer LAN bridging operations (e.g., the spanning tree-based topology calculation—in a non-intrusive manner). The virtual bridge will not compete with the root node of the spanning tree in the customer LAN. The far end LANs appear to be connected directly to the virtual bridge. The physical topology of the metropolitan ethernet segments and the global ethernet segments are totally transparent to the customer ethernet LAN.

Figure 4:
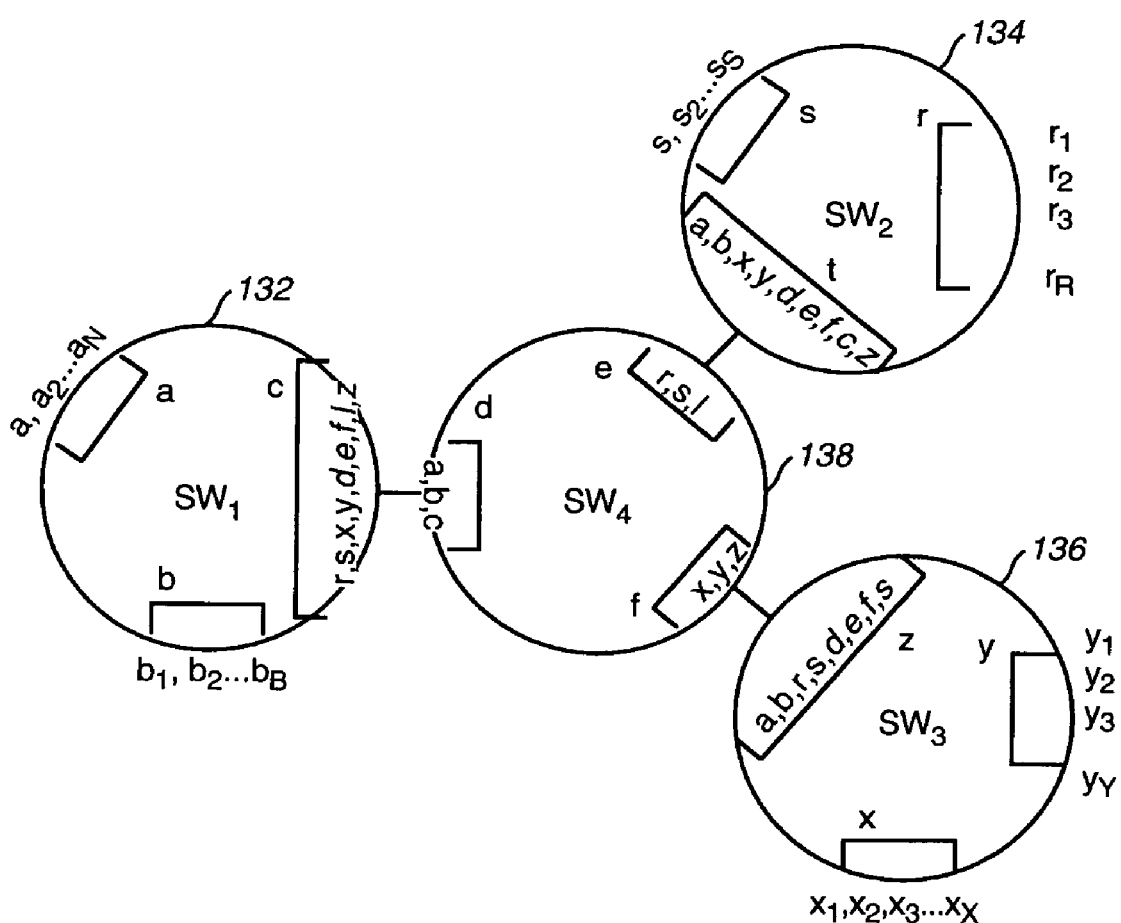
FIG. 4 is an architectural diagram of an ethernet wide area network in accordance with one embodiment of the invention.

FIG. 4 is an architectural diagram of an ethernet wide area network 130 in accordance with one embodiment of the invention. In this diagram each circle represents a WAN ethernet switch (plurality of interconnected network ethernet switches) 132, 134, 136, 138. The MAC address of the interfaces are designated a, b, c, d, e, f, r, s, t, x, y z. The service interfaces are a, b, s, r, x, y and the network interfaces are c, d, e, f, t, z. Next to the interfaces are the MAC addresses the interface has to recognize. The addresses $a_1, \ldots, a_4, b_1, \ldots, b_B, r_1, \ldots, r_R, s_1, \ldots s_S, x_1, \ldots, x_X$, and $y_1, \ldots, y_Y$ represent the MAC addresses of the host stations in the subscriber (user) environment. Each service interface a, b, s, r, x, y blocks any BPDU (Broadcast Protocol Data Units) that originated from the LAN segments to the WAN segments. In addition the service interfaces also block the BPDU originated from the WAN segment to the connected LANs. The service interfaces do exchange BPDUs that are necessary to create a virtual bridge in the WAN to the LAN. There is no exchange of BPDUs between the connected LAN segments.

Figure 5:
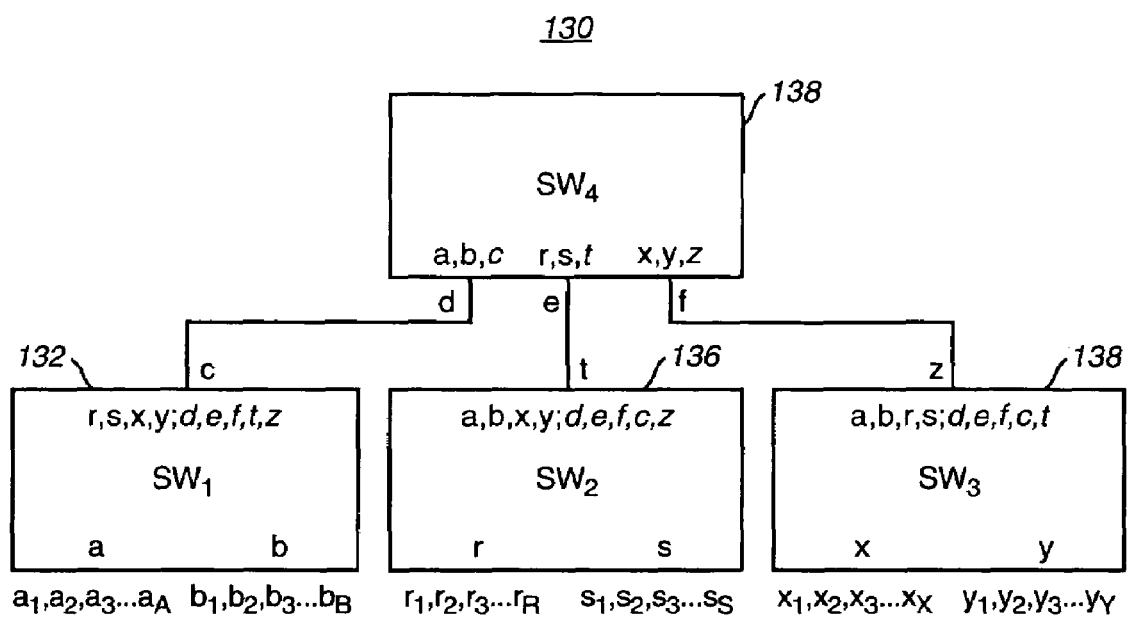
FIG. 5 is a hierarchical diagram of an ethernet wide area network in accordance with one embodiment of the invention.

FIG. 5 is a hierarchical diagram of an ethernet wide area network 130 in accordance with one embodiment of the invention. This diagram is similar to FIG. 4 and shows a spanning tree representation of the network of FIG. 4. Switch (SW4) 138 is the root node switch for the WAN ethernet network. Each LAN network has its own root node. This reduces the complexity and size of the spanning tree for the networks. Note that none of the host MAC addresses from the subscriber LANs needs to appear in the spanning tree of the WAN. The only MAC addresses known explicitly in the WAN spanning tree are the MAC addresses of the service interfaces, trunk interfaces and bridge nodes. This significantly reduces the number of MAC addresses that are required to be learned by the WAN network elements and LAN network elements. All of the MAC addresses in the subscriber environment are transparent to WAN and do not need to be learned in the entire service provider network. They are registered only at the service interface on an individual subscriber basis.

Figure 6:
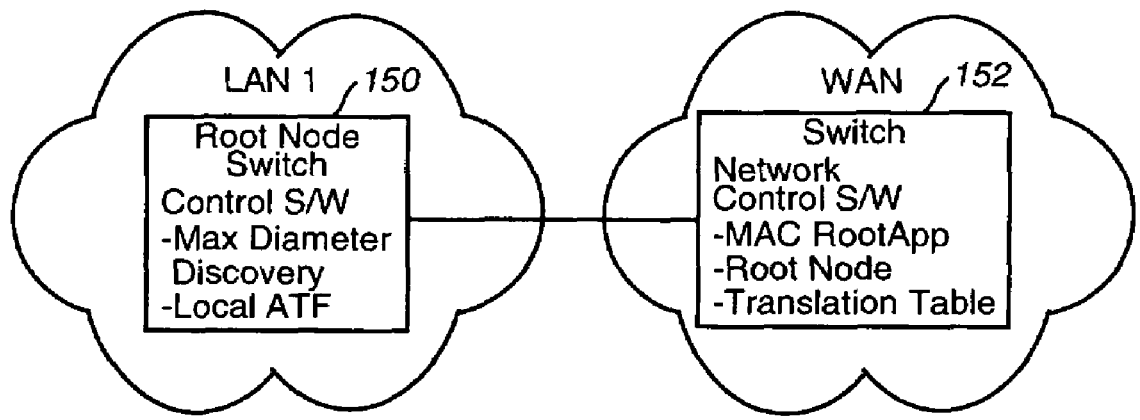
FIG. 6 is block diagram of a root node ethernet switch connected to a network ethernet switch in accordance with one embodiment of the invention.

FIG. 6 is block diagram of a root node ethernet switch 150 connected to a network ethernet switch 152 in accordance with one embodiment of the invention. The root node ethernet switch 150 contains a control software that performs a maximum diameter discovery function and a local ATF (Address Translation Function). The network ethernet switch 152 has network control software that performs a MAC addresses re-mapping function, a root node non-competition function and has a translation table. The maximum discovery algorithm starts by forming a broadcast PDU at each of the root bridge in a LAN. This broadcast PDU is designated with a specific syntax where the root bridge identifier and an initial hub count, start with 0. The broadcast PDU is sent to every nodes in the network as an inquiry. In addition, the broadcast PDU also carries a specific protocol type to signal the receipt of the packet type. At each stage of the spanning tree, the forward broadcast operations replicate the PDU to all sub-trees and increment the hub count by one. This broadcast eventually reaches a leaf bridge of the spanning tree. Each leaf bridge node responds to the root bridge node with a PDU that contains the final hub counts. As the root bridge gathers the replies on the hub counts on its first level branch basis, it can derive the maximum diameter of the network by adding the largest hub counts and the second largest hub counts from all its sub-tree branches.

After the root node discovers its maximum diameter, the value is recorded at the root node and can propagate to all other bridge nodes on a request basis. The maximum diameter discovery algorithm may be executed periodically depending on the frequency of the network topology changes. In another embodiment, a timer governs the frequency of the execution of this algorithm. In another embodiment, the algorithm is executed every time the spanning tree is recalculated or any new bridge node participates in the bridged network. A delay timer postpones this discovery execution until the spanning tree converges in one embodiment. This avoids unnecessary overload of broadcast traffic on the network. The same diameter discovery algorithm is executed in the WAN to determine the diameter of the WAN.

Any node may request the root node to provide the maximum network diameter via a simple inquiry protocol. A bridge node receives a BPDU propagated from the root bridge that has the root bridge address. A specific inquiry PDU is formed to learn the maximum diameter information from the root. This PDU has a protocol identifier that signals the root of the inquiry and a bridge identifier that identifies the initiating bridge node. The return PDU answers the maximum diameter and forwards it to the originating bridge node of the inquiry.

At each WAN service interface, the maximum diameter of the connecting LAN must be registered with the WAN. The service interface, which behaves as a virtual bridge node, should trigger the diameter discovery with the root node in LAN.

The service interface is responsible to relay and respond to the root node the diameter of the virtual bridge that represents the WAN transparent LAN services. All service interfaces should have updated diameters of the connected LANs. Each service interface may request the diameter from the WAN.

The virtual bridge diameter calculation is based on the following set of parameters according to IEEE 802.1D and IEEE 802.1w: WAN diameters; near-end LAN maximum diameter; far-end LAN diameters; default hello time; maximum bridge transit delay; maximum BPDU transmission delay; maximum message age increment overestimate; and default hold time.

The local address translation function involves mapping a MAC address to a network address (e.g., IP address).

The root node non-competition function is a function that selects a MAC address of a service interface connected to a LAN root node to have a lower priority than the root node.

The translation table is a mapping between a MAC address to a network address (e.g., IP address).

The MAC address re-mapping function includes replacing a source host MAC address at a service interface with an ingress service interface MAC address for an inbound packet. Note an inbound packet is a packet headed from a LAN to the WAN. The MAC address re-mapping function further includes replacing an egress service interface MAC address with a destination host MAC address. This re-mapping function reduces the number of required MAC address that need to be learned. The re-mapping requires the network address of the destination in order to perform the re-mapping.

Figure 7:
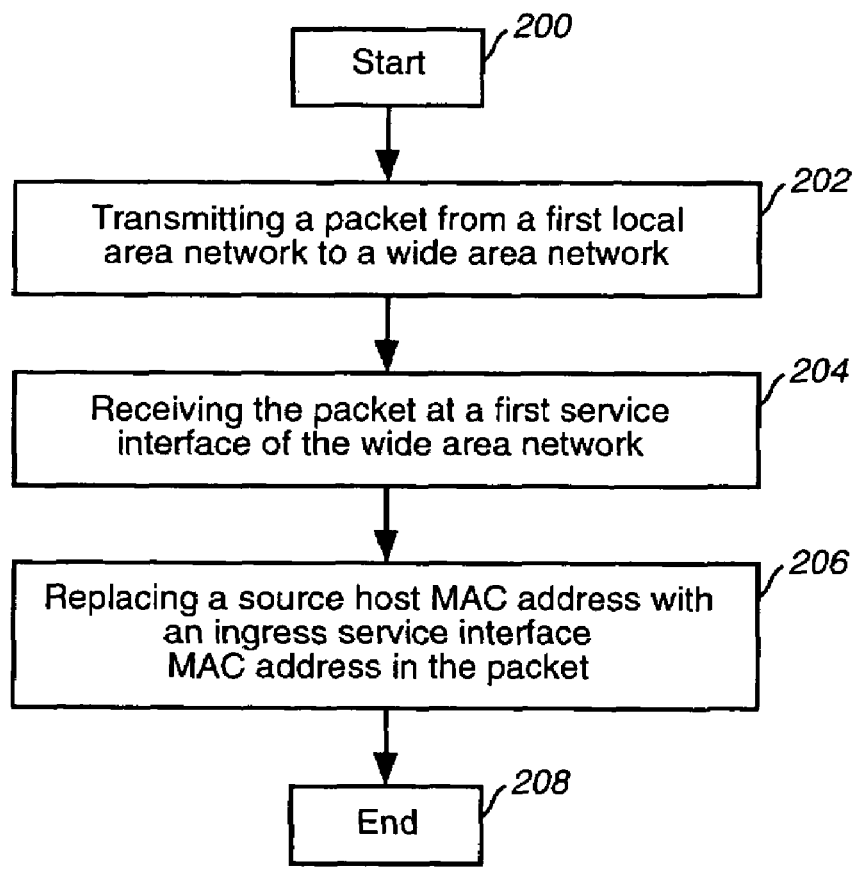
FIG. 7 is a flow chart of the steps used in a method of operating an ethernet wide area network in accordance with one embodiment of the invention.

FIG. 7 is a flow chart of the steps used in a method of operating an ethernet wide area network in accordance with one embodiment of the invention. The process starts, step 200, by transmitting a packet from a first local area network to a wide area network at step 202. The packet is received at a first service interface of the wide area network at step 204. At step 206 the source host MAC address is replaced with an ingress service interface MAC address in the packet which ends the process at step 208. In one embodiment, the packet is transmitted through the wide area network to a second service interface of the wide area network. In one embodiment, when the packet is transmitted the destination MAC address is replaced with a service interface MAC address. An egress service interface MAC address is replaced with a destination host MAC address. In one embodiment, replacing the egress service interface includes determining a destination host address. A lookup is performed in a translation table using the destination host address.

Thus there has been described an ethernet wide area network and method that overcomes the limitation that do not allow nationwide or international ethernet networks. In addition the invention overcomes the size limitations for ethernet networks.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A wide area ethernet network, comprising:
   a plurality of interconnected network ethernet switches;
   a first one of the plurality of interconnected network ethernet switches having a first service interface to connect to a first local area network, the first one of the plurality of interconnected network ethernet switches configured to select a MAC address of the service interface to have a lower priority than a root node of the first local area network; and
   a second one of the plurality of interconnected network ethernet switches having a second service interface to connect to a second local area ethernet switch, wherein the first service interface initiates a local address translation function to map a plurality of first local area network MACs to a plurality of upper layer addresses.

2. The ethernet wide area network of claim 1, further comprising a translation table to translate a network address to a MAC address.

3. The ethernet wide area network of claim 1, further comprising a spanning tree for the plurality of interconnected network ethernet switches, the spanning tree including MAC addresses for only a plurality of service nodes.

4. The ethernet wide area network of claim 1, further comprising control software to adjust a transmission delay based on a maximum bridge diameter.

5. The ethernet wide area network of claim 1, further comprising an optical repeater connected to one of the plurality of interconnected network ethernet switches.

6. The ethernet wide area network of claim 4, further comprising control software to discover the maximum bridge diameter.

7. The ethernet wide area network of claim 1, wherein the local address translation function is broadcast to a virtual local area network group.

8. For use with a first local area network having a first root node and a second local area, an ethernet wide area network, comprising:
   a virtual bridge to connect to the first root node;
   the virtual bridge comprising a plurality of interconnected network ethernet switches; and
   at least one of the plurality of interconnected network ethernet switches configured to perform a root node non-competition function, at least one of the plurality of interconnected network ethernet switches having a first service interface to connect to the first local area network, wherein the first service interface initiates a local address translation function to map a plurality of first local area network MACs to a plurality of upper layer addresses.

9. The ethernet wide area network of claim 8, further comprising control software to perform a MAC address re-mapping.

10. The ethernet wide area network of claim 9, wherein the MAC address re-mapping includes replacing a source host MAC address at a service interface with an ingress service interface MAC address for an inbound packet.

11. The ethernet wide area network of claim 9, wherein the MAC address re-mapping includes replacing an egress service interface MAC address with a destination host MAC address.

12. The ethernet wide area network of claim 9, further comprising a translation table to translate a network address to a MAC address.

13. For use with a first local area network having a first local area ethernet switch and a second local area network having a second local area ethernet switch, the first local area ethernet switch having a first root node, an ethernet wide area network, comprising:
   a plurality of interconnected network ethernet switches, a first one of the plurality of interconnected network ethernet switches to connect to the first ethernet switch, network control software being associated with at least one of the plurality of interconnected network ethernet switches, the network control software including a MAC address re-mapping, a root node non-competition function and a translation table, at least one of the plurality of interconnected network ethernet switches having a first service interface to connect to the first local area network, wherein the first service interface initiates a local address translation function to map a plurality of first local area network MACs to a plurality of upper layer addresses; and
   an optical repeater connected to one of the plurality of interconnected network ethernet switches.

* * * * *